(12) United States Patent
Howard

(10) Patent No.: US 8,185,429 B2
(45) Date of Patent: May 22, 2012

(54) SYSTEM AND METHOD OF MAKING SALES CALLS

(76) Inventor: Robert H. Howard, Coppell, TX (US)

( * ) Notice: Subject to any disclaimer, the term of this patent is extended or adjusted under 35 U.S.C. 154(b) by 1439 days.

(21) Appl. No.: 11/216,991

(22) Filed: Aug. 30, 2005

(65) Prior Publication Data

US 2006/0047708 A1 Mar. 2, 2006

Related U.S. Application Data

(60) Provisional application No. 60/605,465, filed on Aug. 30, 2004.

(51) Int. Cl.
*G06Q 10/00* (2012.01)

(52) U.S. Cl. ... 705/7.26; 705/7.27; 705/500; 707/999.2; 379/201.01; 379/265.06; 379/216.01

(58) Field of Classification Search .................. None
See application file for complete search history.

(56) References Cited

U.S. PATENT DOCUMENTS

| | | | | | |
|---|---|---|---|---|---|
| 5,790,650 | A | * | 8/1998 | Dunn et al. | 379/265.03 |
| 5,946,375 | A | * | 8/1999 | Pattison et al. | 379/112.01 |
| 5,974,135 | A | * | 10/1999 | Breneman et al. | 379/265.04 |
| 5,991,390 | A | * | 11/1999 | Booton | 379/265.02 |
| 6,058,163 | A | * | 5/2000 | Pattison et al. | 379/265.06 |
| 6,067,357 | A | * | 5/2000 | Kishinsky et al. | 379/265.02 |
| 6,178,239 | B1 | * | 1/2001 | Kishinsky et al. | 379/266.07 |
| 6,324,282 | B1 | * | 11/2001 | McIllwaine et al. | 379/265.06 |
| 6,377,944 | B1 | * | 4/2002 | Busey et al. | 1/1 |
| 6,381,640 | B1 | * | 4/2002 | Beck et al. | 709/223 |
| 6,597,685 | B2 | * | 7/2003 | Miloslavsky et al. | 370/352 |
| 6,604,084 | B1 | * | 8/2003 | Powers et al. | 705/7.41 |
| 6,614,895 | B1 | * | 9/2003 | Impey et al. | 379/127.01 |
| 6,724,887 | B1 | * | 4/2004 | Eilbacher et al. | 379/265.03 |
| 6,915,336 | B1 | * | 7/2005 | Hankejh et al. | 709/219 |
| 7,035,388 | B2 | * | 4/2006 | Kurosaki | 379/142.06 |
| 7,158,628 | B2 | * | 1/2007 | McConnell et al. | 379/265.02 |

(Continued)

OTHER PUBLICATIONS

John R Graham. (Jul. 1997). No more business as usual—the focusing of the customer's mind. Direct Marketing, 60(3), 44-45.*

*Primary Examiner* — Lynda Jasmin
*Assistant Examiner* — Gurkanwaljit Singh
(74) *Attorney, Agent, or Firm* — Triangle Patents

(57) ABSTRACT

A database navigation system simplifies the navigation and use of sales target information in a database. The salesperson, i.e., the user, begins navigating and using the database by logging into the secured system using a computer. Once logged in, the system displays a Leads Worksheet that lists the sales targets, or "suspect", from the database assigned to that user and the name of a prospecting process, i.e., a prospecting cycle, that the user will follow with that target. The prospecting cycle comprises of several management-defined steps. Once the user creates a To-Do list of the targets to pursue that workday, the user goes to an Action Page. Here, the user completes the actions in the step of the prospecting cycle for each selected sales target using the tools provided. The system creates a log, i.e., a history, of the user's actions including phone calls, e-mails, video transmissions, and the like as related to the target. The history of user interaction with target data creates metrics used by the salesperson and management to evaluate performance and generate performance reports. All the above is achieved by navigating two screens with a computer mouse and with no input of information (save the optional comment) into the database by the salesperson. Thereby, this essentially automates the "cold call" sales prospecting process.

20 Claims, 10 Drawing Sheets

U.S. PATENT DOCUMENTS

| | | | |
|---|---|---|---|
| 7,174,010 B2 * | 2/2007 | McIlwaine et al. | 379/265.01 |
| 7,383,513 B2 * | 6/2008 | Goldberg et al. | 715/763 |
| 2001/0004743 A1 * | 6/2001 | Krueger et al. | 709/206 |
| 2002/0009190 A1 * | 1/2002 | McIllwaine et al. | 379/265.06 |
| 2002/0019846 A1 * | 2/2002 | Miloslavsky et al. | 709/206 |
| 2002/0056000 A1 * | 5/2002 | Coussement | 709/225 |
| 2002/0101866 A1 * | 8/2002 | Miloslavsky et al. | 370/386 |
| 2003/0228007 A1 * | 12/2003 | Kurosaki | 379/142.06 |
| 2004/0059639 A1 * | 3/2004 | Ripper et al. | 705/26 |
| 2005/0021529 A1 * | 1/2005 | Hodson et al. | 707/100 |
| 2005/0216269 A1 * | 9/2005 | Scahill et al. | 704/270.1 |

* cited by examiner

FIG. 4

Goal Reporting for Saucerware Technologies

| No of Days | 1st Step Goal | 1st Step Actual | 1st Step % | Total Steps Goal | Total Steps Actual | Total Steps % | Steps Per Day | Closure Total | Conversion # | Conversion % | Closure Appt # | Closure Appt % | Success # | Success % | ReCycle # | ReCycle % |
|---|---|---|---|---|---|---|---|---|---|---|---|---|---|---|---|---|
| 15 | 0 | 2 | 0 | 0 | 5 | 0 | 0.17 | 2 | 2 | 100 | 2 | 100 | 0 | 0 | 1 | 50 |

| Cycle | No of Suspects | Steps/Cycle | 1st Step # | 1st Step % | Total Steps # | Total Steps % | Total | Conversion # | Conversion % | Closure Appt # | Closure Appt % | Success # | Success % | ReCycle # | ReCycle % |
|---|---|---|---|---|---|---|---|---|---|---|---|---|---|---|---|
| New Campaign | 2 | 5 | 0 | 0 | 0 | 2 | 0 | 0 | 0 | 0 | 0 | 0 | 0 | 0 | 0 |
| Referrals | 13 | 4 | 1 | 50 | 2 | 40 | 2 | 2 | 100 | 2 | 100 | 0 | 0 | 1 | 50 |
| Starter 4x4 | 9 | 4 | 1 | 50 | 3 | 60 | 0 | 0 | 0 | 0 | 0 | 0 | 0 | 0 | 0 |

Goal Reporting for Niki Watson

| No of Days | 1st Step Goal | 1st Step Actual | 1st Step % | Total Steps Goal | Total Steps Actual | Total Steps % | Steps Per Day | Closure Total | Conversion # | Conversion % | Closure Appt # | Closure Appt % | Success # | Success % | ReCycle # | ReCycle % |
|---|---|---|---|---|---|---|---|---|---|---|---|---|---|---|---|---|
| 15 | 0 | 1 | 0 | 0 | 3 | 0 | 0.20 | 2 | 2 | 100 | 2 | 100 | 0 | 0 | 1 | 50 |

| Cycle | No of Suspects | Steps/Cycle | 1st Step # | 1st Step % | Total Steps # | Total Steps % | Total | Conversion # | Conversion % | Closure Appt # | Closure Appt % | Success # | Success % | ReCycle # | ReCycle % |
|---|---|---|---|---|---|---|---|---|---|---|---|---|---|---|---|
| Referrals | 13 | 4 | 1 | 100 | 2 | 67 | 2 | 2 | 100 | 2 | 100 | 0 | 0 | 1 | 50 |
| Starter 4x4 | 9 | 4 | 0 | 0 | 1 | 33 | 0 | 0 | 0 | 0 | 0 | 0 | 0 | 0 | 0 |

SYSTEM AND METHOD OF MAKING SALES CALLS

This application claims the benefit of U.S. Provisional Application No. 60/605,465 filed Aug. 30, 2004, which is incorporated herein by reference.

BACKGROUND OF INVENTION

1. Field of Invention

The present invention relates generally to a database navigation system that effectuates retrieving, viewing, and updating information in a database. More particularly, the invention relates to a secure database navigation system that simplifies navigating and using sales target information in a database to pursue sales leads and logs a user's interaction with that target data.

2. Description of Related Art

Possibly up to a hundred times a day, a salesperson may make a telephone call to solicit business to a potential customer without prior contact or lead (i.e., cold call). The salesperson most likely selects their targets or "suspects" from a list. This list could be on paper but is most likely in electronic form contained in a database. To effectively bring closure to each target in the database, a sales person will pursue the target to one of three conclusions: successfully contact the target, recycle the target to be pursued later, or remove the target from the database. To bring closure to each target, the salesperson must rely on efficiently navigating a precise pursuit plan and make use of target information on a database as well as their sales experience.

The salesperson eventually masters the "art" of the sale itself: actual spoken contact with the target. However, efficiently navigating and making use of target information on a database is something that a typical salesperson has not the time, the computer skills, or the inclination to master.

The salesperson's inability to follow a pursuit plan designed by their management, to easily create and maintain some sort of daily "plan of attack" of the target list, to quickly and efficiently navigate the target data, and to create a history of the salesperson's interaction with the target data is not effectively addressed by the prior art. Hence, there is a real and timely need for a practical system that addresses these needs. Specifically, the prior art is lacking in a process whereby a salesperson can quickly, easily, efficiently, and consistently perform the proper sequence to reach closure during the pursuit of a target through either a successful contact, recycling a target to be contacted later, or removing a target from the database. These prior art systems require the salesperson to navigate several screens, execute multiple mouse clicks, and often key data into the database. Essentially, the current systems are cumbersome, tedious, and slow, if effective at all, at overcoming deficiencies of the typical salesperson.

SUMMARY OF INVENTION

The present invention provides a practical system for the navigation and use of target information in a database and also creates a history of user interaction with target data through the use of a database navigation system.

In the preferred embodiment, a salesperson will spend the vast majority of his time using the following parts of the database navigation system: a leads worksheet, action page and customize screen.

The salesperson, i.e., the user, begins navigating and using the database by logging into a secured system using a computer. Once logged in, the database navigation system displays a leads worksheet that lists the targets from a database assigned to that user and the name of a prospecting process (i.e., a prospecting cycle) that the user will follow with that target.

The prospecting cycle is comprised of several steps that the sales person performs during the process of contacting targets. Only management, or a system administrator, has the ability to define the steps, the actions for each step, the messaging for each action, and the timing between each step. In addition, management, or a system administrator, can create and modify prospecting cycles and the steps of each cycle. Use of management-defined cycles create a level of quality and consistency in how targets are approached by the business' sales force. The system, based on these cycles, allows the salesperson to easily create and maintain a daily plan using the target list, navigate the target data quickly and efficiently, and create a history of the salesperson's interaction with the target data.

When the system is accessed, each active or current target is displayed according to the date of the next step in the sales process as defined by the target's assigned cycle. After the system is accessed, a to-do list for that workday is created. To create the to-do list, the user selects the targets to be contacted for the current workday and, based on the selected targets, the to-do list is created. After the targets are selected for the to-do list, an action page button is selected to display an action page.

The action page displays the first target on the user's to-do list. Here, the system shows the steps already taken in the prospecting cycle, the recommended next step in the prospecting cycle for that target, the actions for that step, the tools needed to take those actions, and a means to document the outcome of the actions. Once the user completes the step, an execute button is selected which causes any comments to be recorded, automated actions to run, and the target's information to be updated with the user's activities. Then, the next target on the user's to-do list is displayed.

For some targets, the user may want to change, or customize, an automated e-mail message that may be one of the actions for a step. To do this, the user selects a customize button on the action page to cause the system to display a customize screen. There, the user can include attachments, modify the automatically-filled sender and recipient information, modify the subject line and message body, or any combination thereof. Any changes made are temporary and apply only to the specific target.

If the user completes a step that includes a phone call, a reaction or response to the phone call is selected from a drop-down menu. Selection of a reaction allows the system to create a history of the user's interaction with that target. It also creates metrics that can be used to create performance data for members of the sales force and management. A visual display of metrics, referred to as a goals snapshot, for an individual salesperson is located on the leads worksheet. Here, the salesperson can compare his actual performance in real time with his personal goals or against management's goals. These metrics can also be used to populate performance reports for both the salesperson and management.

The primary advantage of the database navigation system of the present invention is that it essentially automates the "science" of the "cold call" by assisting in the identification of the salesperson's targets to pursue that workday, navigation of a target list, and completion of management-defined steps in the prospecting cycle the salesperson should follow. Another advantage of the present invention is that it reduces the salesperson's navigation of and interaction with target data to a small series of clicks with a mouse using only two screens. No data entry by the salesperson is required. This aspect makes the system more user friendly, requires relatively little training to use, and creates relatively uniform results. Because the system does not require typing except for comments, the current system is faster than the prior art, which does require frequent typing to operate a system and record events. Consequently, the current system results in increased production by the sales force of a business.

BRIEF DESCRIPTION OF THE DRAWINGS

The novel features believed characteristic of the invention are set forth in the appended claims. The invention itself, however, as well as further objectives and advantages thereof, will be best understood by reference to the following detailed description of illustrative embodiments when read in conjunction with the accompanying drawings, wherein:

FIG. 4 is a screen shot of the action page in accordance with an embodiment of the present invention;

FIG. 9 is a screen shot of a performance report in accordance with an embodiment of the present invention;

FIG. 10 is a screen shot of a screen showing the administrative functions in accordance with an embodiment of the present invention.

DETAILED DESCRIPTION

Figure 1:
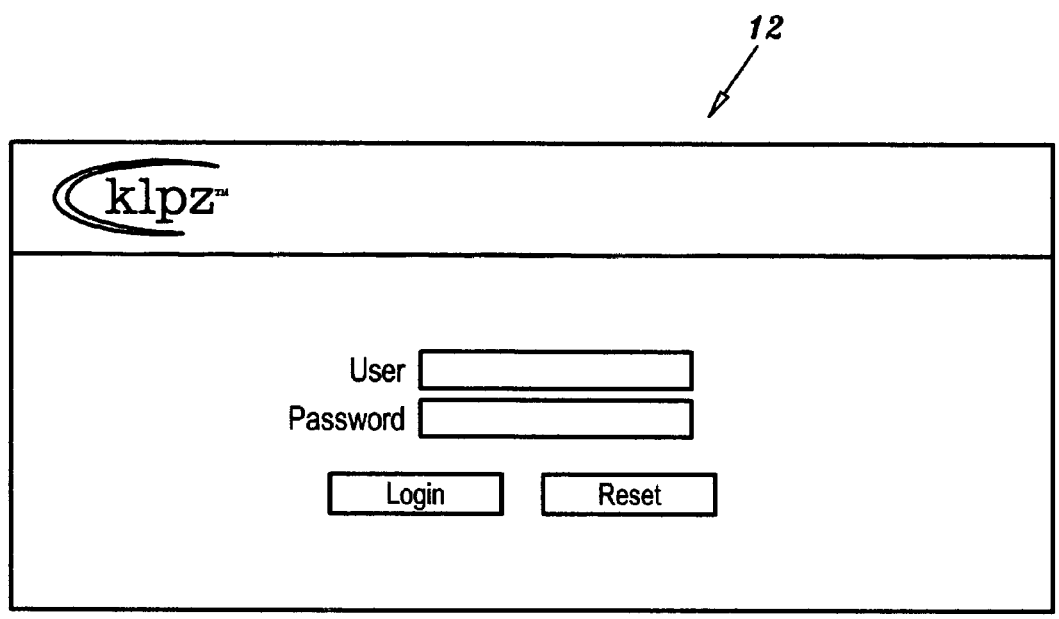
FIG. 1 depicts a log in screen generated by the preferred embodiment of the database navigation system.

Illustrative embodiments and exemplary applications of the present invention will now be described with reference to the accompanying drawings. In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

The system comprises a database stored on a server or server cluster, which is connected to at least one local computer via a network link. The network link may be the Internet, WAN, LAN, or some other similar type of connection used to connect a local computer to the server and may use a communications protocol stack that includes transmission control protocol (TCP) and Internet protocol (IP) layers, sequenced packet exchange (SPX) and internetwork packet exchange (IPX) layers, Appletalk transaction protocol (ATP) and datagram delivery protocol (DDP) layers, DOCSIS, or any other suitable protocol or combination of protocols. The local computer may be any type of computer system that is capable of executing the present invention. The local computer may also be a stand alone computer wherein the data necessary for the present invention is contained on a storage device. The storage device may be any suitable storage device, such as a hard disk, floppy disk drive, flash RAM card, recordable CD-ROM drive, DVD-ROM, or any other suitable storage device known in the art.

In FIG. 12, Step 168 shows that the system is accessed by a user. After the system is accessed, each active or current target assigned to the user is displayed, Step 170. Then, the user selects the targets to be contacted for the current workday and, based on the selected targets, a to-do list is created, Step 172 and an action page displays the first active target on the user's to-do list, Step 174. On the action page, the system displays the recommended step in the prospecting cycle for that target. The user may elect to perform the displayed step or modify the displayed step, Step 176. If the user modifies the displayed step, the user may, for example, include attachments to an e-mail, modify the automatically-filled sender and recipient information of the e-mail, or modify the subject line and message body of the e-mail, Step 178. After the user modifies the displayed step, the user may elect to perform the displayed step or further modify the displayed step, Step 176. If the user performs the displayed step, an execute button is selected which causes any comments to be recorded, Step 180, reactions to any phone calls to be recorded, Step 182, automated actions to run, Step 184, and the target's information to be updated in the system's database, Step 186. Then, the system determines if the to-do list is completed, Step 188. If the to-do list is completed, each active or current target assigned to the user is displayed, Step 170. If the to-do list is not completed, then the next target in the to-do list is activated and the action page displays the newly activated target, Step 174.

Figure 2:
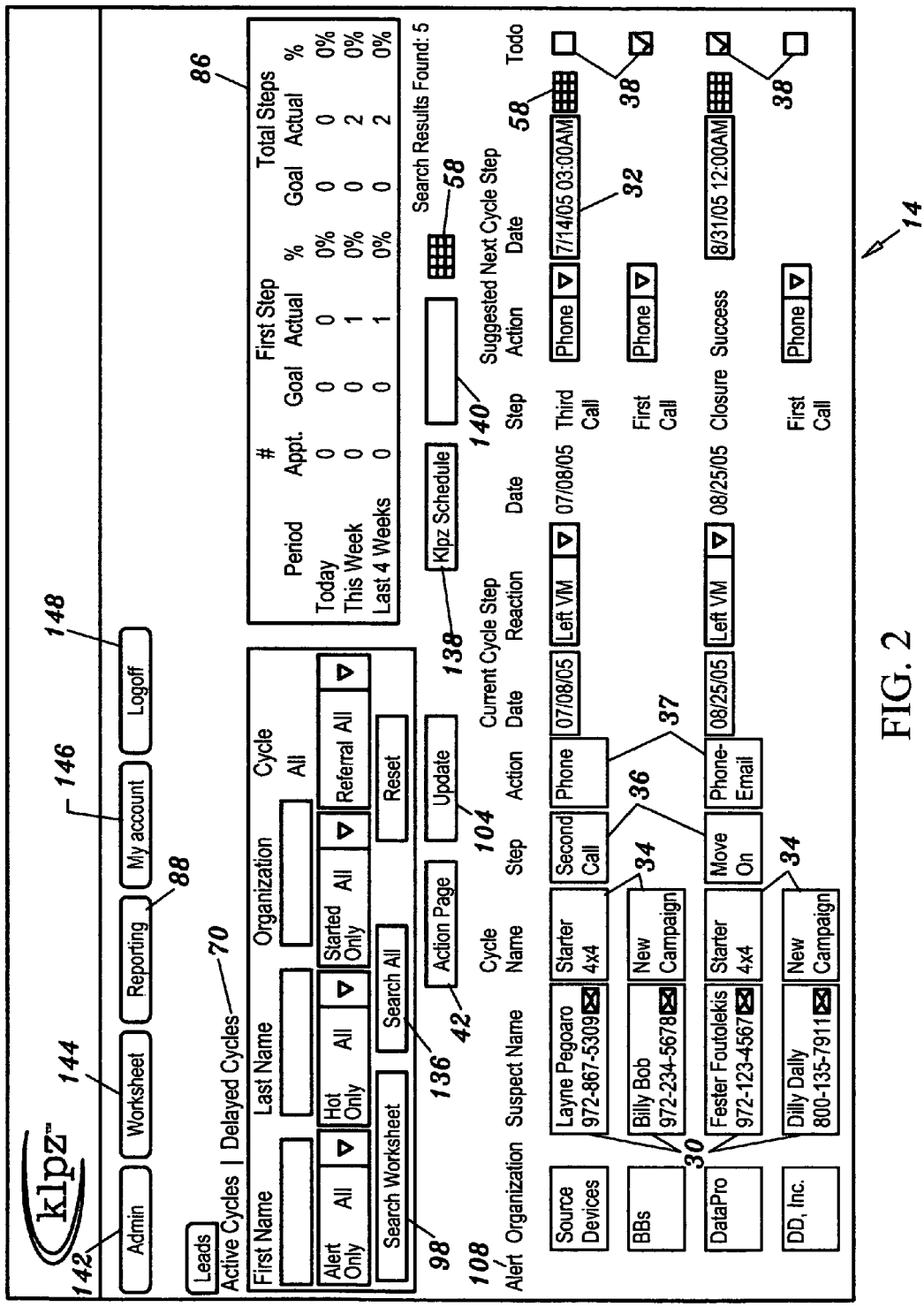
FIG. 2 depicts a leads worksheet screen in accordance with an embodiment of the present invention.

The system is accessed via the system's log in screen 12 as shown in FIG. 1. Once access is gained, leads worksheet 14, as illustrated in FIG. 2, is displayed. To display leads worksheet 14, the system access a database that contains sales targets assigned to the logged in user. The system also displays, in sales target box 30, a list of sales targets assigned to the logged in user; in cycle box 34, the name of the prospecting cycle assigned to each particular sales target; in cycle step box 36, the step that was previously taken; and in action box 37, what action was taken for the step displayed in cycle step box 36. Also displayed may be other information relating to the current cycle step as well as information relating to the next cycle step.

Figure 3:
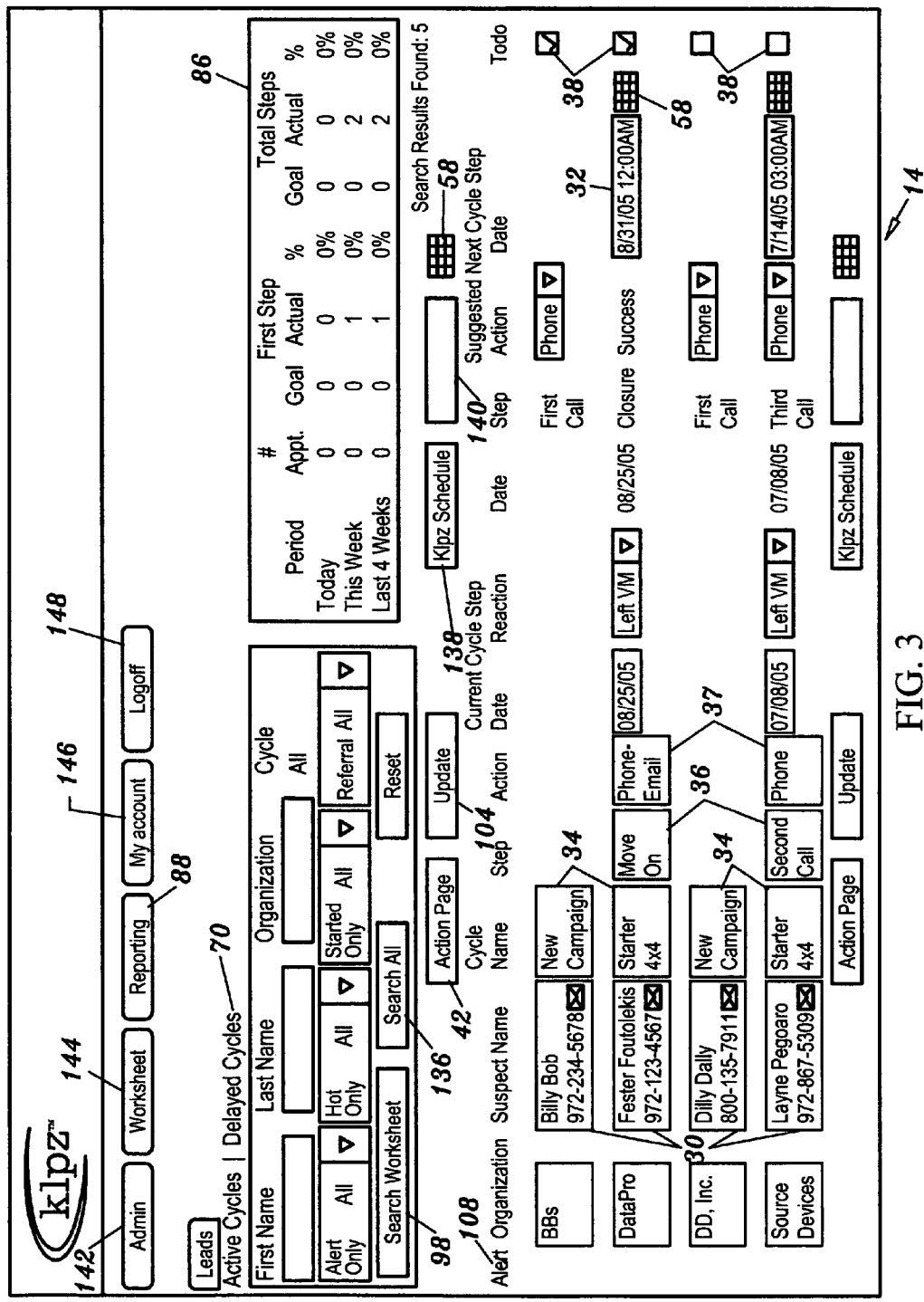
FIG. 3 is a screen shot of the use of the organization hyperlink on the leads worksheet, shown in FIG. 2, to sort sales target information by organization name in accordance with an embodiment of the present invention.

The sales targets may be sorted chronologically by the suggested next cycle date as displayed in next cycle step box 32. The sales targets can also be sorted by organization, suspect name or cycle name by clicking on their associated column headings. For example, if the column heading "Organization" is clicked, then the sales targets are sorted alphabetically by their associated organization as shown in FIG. 3.

Figure 4:
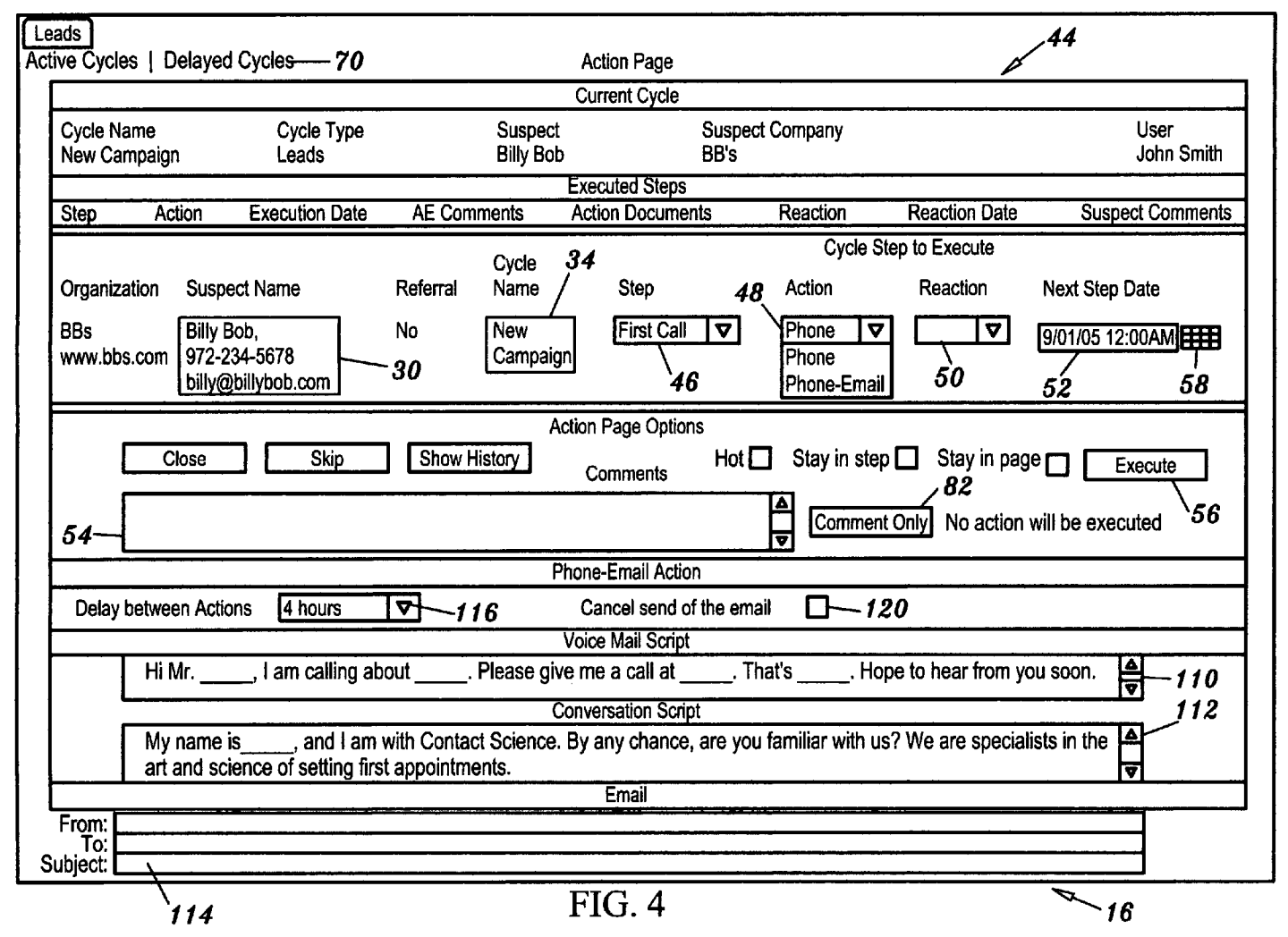
Figure 5:
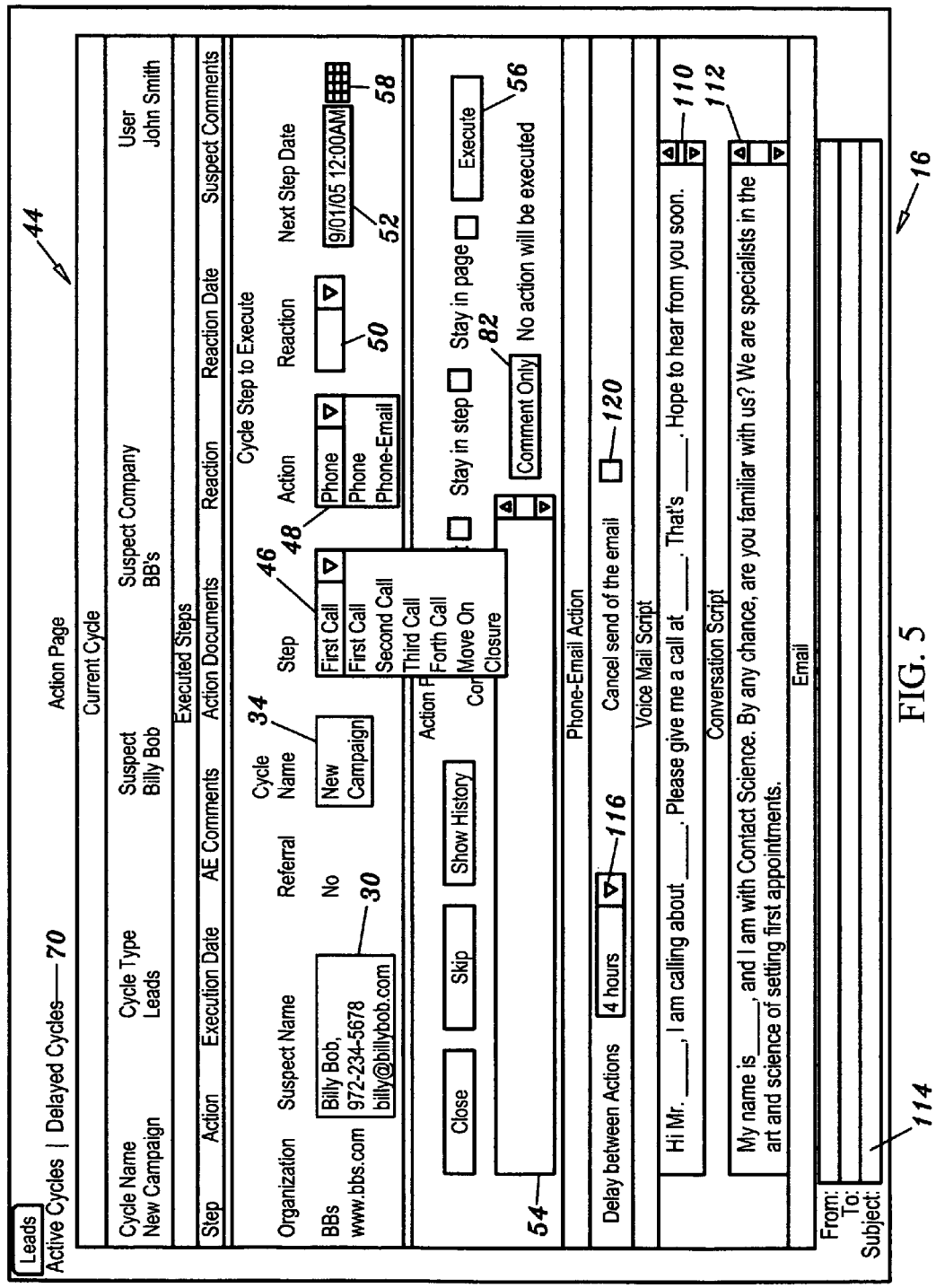
FIG. 5 is a screen shot of the drop-down menu showing the steps in a prospecting cycle in accordance with an embodiment of the present invention.

To the right of the target information on leads worksheet 14, a to-do check box 38 allows for the creation of a to-do list. The to-do list is created by placing a check in check box 38 for the targets that are intended to be contacted that day or moment. Once the targets are chosen, action page button 42 is selected and action page 16, shown in FIG. 4, is displayed Action Page 16 displays the first target on the to-do list as well as details regarding the steps to execute the cycle assigned to that target. Details regarding the cycle are shown in execute panel 44 of action page 16. Execution panel 44 contains the target's name in target name box 30, the cycle assigned to the target in cycle box 34, the recommended step to be taken in recommended step drop-down menu 46, and action drop-down menu 48 which displays the recommended action for step shown in step column 46. Also displayed is reaction drop-down menu 50 and next step date column 52. Reaction drop-down menu 50 allows a user the ability to select the reaction the user experienced if the action displayed in action column 48 is a phone call. Next step date column 52 displays the date the next step should be taken and is automatically generated based on the cycle associated with the target. The steps in the target's cycle can be displayed by the selection of step drop-down menu 46, and an example of such steps are illustrated in FIG. 5.

It should be noted that only management or an administrator can build, or modify, a cycle and its associated steps. By utilizing standard cycles and steps, management can build a consistent series of procedures or processes used to enforce best practices when dealing with sales targets. Each salesperson follows the same steps with every target assigned to that cycle. Therefore, use of these management-defined cycles creates a level of quality and consistency in how targets are approached by the business's sales force.

Once a step is selected from step drop-down menu 46, the tools needed to execute the step are displayed. The tools can include, but are not limited to, a comment to add to the displayed target's information, a voice mail script as shown in voice mail script box 110, a conversation script shown in conversation script box 112, automated follow-up e-mail shown in e-mail box 114, the ability to preview any of electronic deliverable packages used such as a video or audio file, or any combination thereof.

The voice mail script as shown in voice mail script box 110 provides a script that is to be read when leaving a voice mail for the target. The conversation script shown in conversation script box 112 provides a script that is to be read if the target answers the telephone. The automated follow-up e-mail shown in e-mail box 114 is what is sent after an attempt to contact the target has been made. The follow-up e-mail may be sent when a voice mail is left or when contact with the target has been made.

When the actions associated with the step displayed in step drop-down menu 46 are completed, execute button 56 is selected and the system records any comments made, runs the automated tools, and updates the sales target database with the user's activities. Then, action page 16 automatically refreshes and displays the next target on the to-do list.

For some targets, the automated e-mail package may need to be changed or customized to include or remove an email message, video, or other attachment. To do this, a customize button may selected. After the customize button is selected, a customize screen is displayed. From the customized screen, attachments can be included with the e-mail, the automatically-filled sender and recipient information can be modified, and the subject line and message body can be modified. In the preferred embodiment, changes made in the customize screen are temporary and only apply to the specific target.

Figure 6:
FIG. 6 is a screen shot of the sales targets with delayed cycles in accordance with an embodiment of the present invention.

If the step shown in step drop-down menu 46 is a "combination step", such as a phone action and sending an e-mail, the actual sending of the automated e-mail may include an electronic deliverable package and the sending of the e-mail may be delayed for a specified amount of time. Preferably, the amount of time is four hours by design but can be almost any length of time. The delay can be changed by selecting the specific amount of time to delay sending the automated e-mail from delay drop-down menu 116. The delay time displayed in delay drop-down menu 116 may be in 1, 5, 10, 20, 30 minute or 1 hour increments, or any combination thereof To view all the delayed steps or actions, delayed cycle tab 70 is selected. After delayed cycle tab 70 is selected, all targets with delayed cycles are displayed, as illustrated in FIG. 6.

To change a specific target's delay cycle, a new delay time chosen from new delay drop-down menu 118. The delay time displayed in drop-down menu 118 may be any suitable time increment such as 1, 5, 10, 20, 30 minute, 1 hour increments, or any combination thereof Once the new delay time is selected, reschedule selected button 74 is selected to record the new time.

Figure 7:
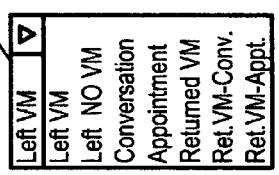
FIG. 7 is a screen shot of the dropdown menu for the reaction to an action such as a phone call in accordance with an embodiment of the present invention.

Returning to FIG. 4, if an e-mail is part of the action displayed in action drop-down menu 48 but is not to be sent, then cancel send of the e-mail box 120 is selected and the e-mail is not sent. If cancel send of the e-mail box 120 was not selected and the e-mail was delayed, the e-mail may also be canceled by selecting delayed cycle tab 70 and displaying all the targets with delayed cycles as illustrated in FIG. 7. Then the target's to-do check box 38 is checked, "cancel selected" button 122 is selected and the e-mail associated with the selected target is not sent.

Figure 8:
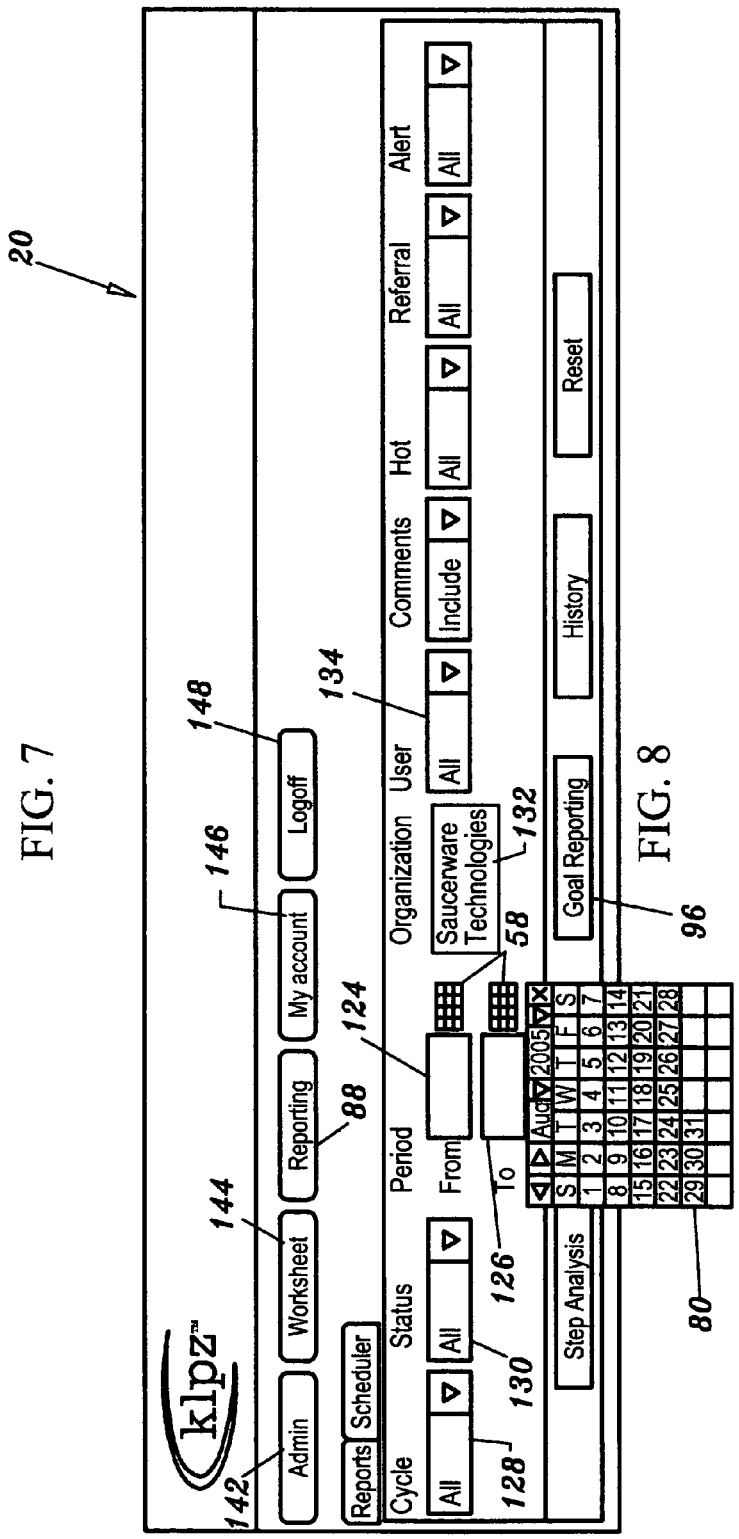
FIG. 8 is a screen shot of the reporting screen in accordance with an embodiment of the present invention.

At times, the user may want to delay a step with a target and make a comment as to why. To do so, a comment is inserted into comment box 54. Then, to delay the step, calendar icon 58 is selected causing a drop-down calendar similar to drop-down calendar 80 illustrated in FIG. 8 to be displayed. Using the displayed drop down calendar, the date for performing the next step can be modified and displayed in next step box 52. Next, comment only button 82, illustrated in FIG. 4 is selected. After comment only button 82 is selected, the comment is recorded and no action is taken.

Figure 10:
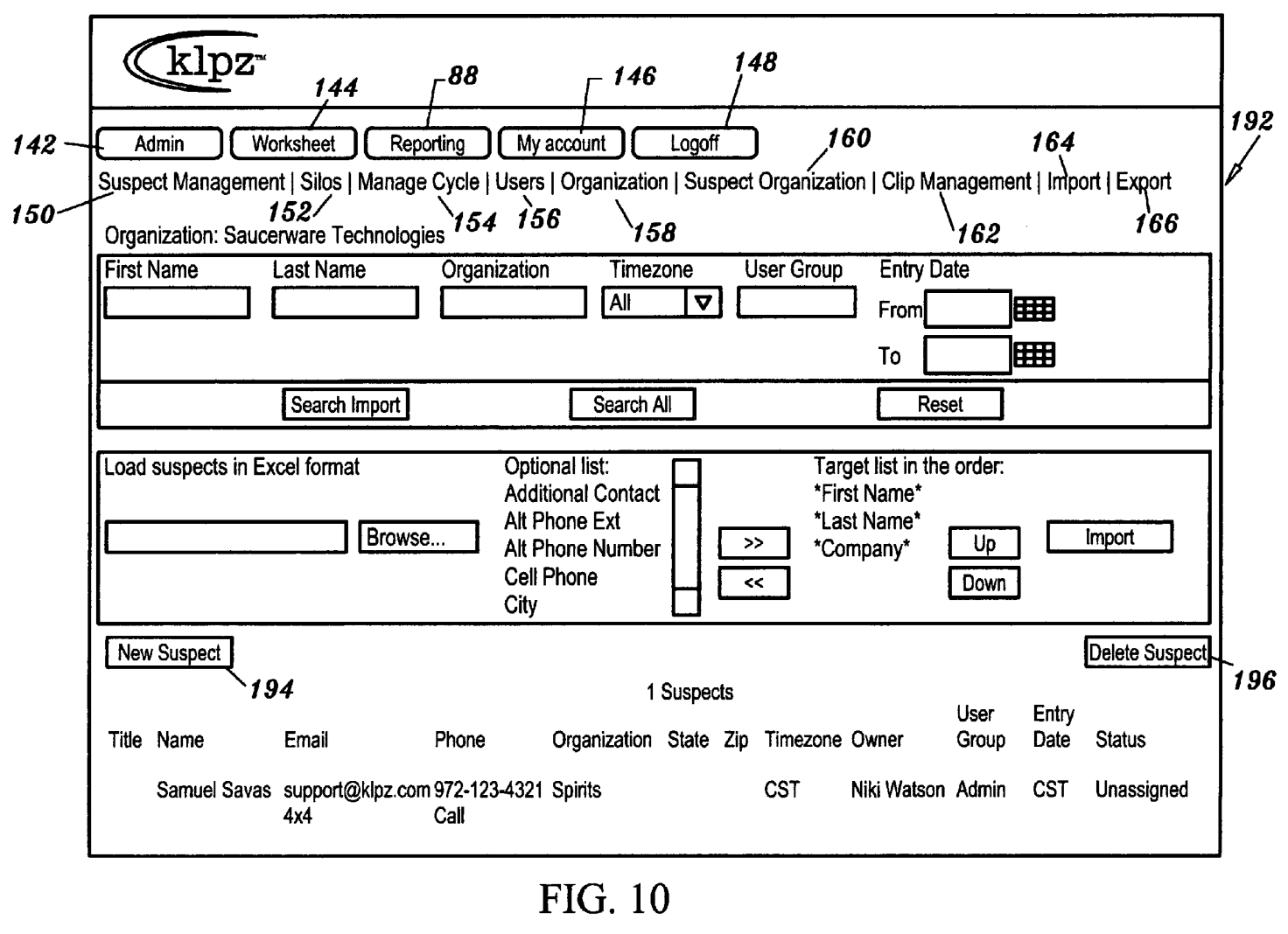

When a step that includes a phone action is completed, a reaction selected from reaction drop-down menu 50 is selected. As shown in FIG. 10, the selected reaction from reaction drop-down menu 50 may include but is not limited to left a voice mail, left no voice mail, had a conversation with the target, made an appointment with the target, returned a call and left a voice mail, returned a call and had a conversation with the target, or returned a call and made an appointment with the target. By forcing the documented reaction to be selected from a standardized list, uniform results are created and the user is not required to type the reaction. Selection of a standard reaction allows the system to create a history of the user's interaction with that target and creates metrics that can be used to create performance data for the members of the sales force and management.

A visual display of metrics for the individual salesperson, or "goals snapshot", is located on leads worksheet 14, in goals box 86, as shown in FIG. 2. Here, the salesperson can, in real time, compare his actual performance with his personal goals or against the management's goals. Goals box 86 may display how many appointments have been made during a certain time period, how many goals have been achieved, how many first, second, or third steps have been performed, and may provide a percentage of how many goals have been reached or actual steps in a cycle were performed.

The metrics can also be used to populate performance reports for both the salesperson and management. To create a performance report, reporting tab 88 is selected. After reporting tab 88 is selected, reporting screen 20 shown in FIG. 9 is displayed.

Reporting screen 20, displays the report's start and end dates in start date box 124 and end date box 126 respectively. The dates may be changed via drop-down calendar 58. In addition, the cycle type may be selected from cycle dropdown menu 128, the status may be selected from status drop-down menu 130, the organization may be selected from organization drop-down menu 132, and the user may be selected from user drop-down menu 134. Cycle drop-down menu 128 contains a list of all the cycles in the system's database, status drop-down menu 130 contains a list of the status each cycle in the system's database may be in, organization drop-down menu 132 contains a list of all the organizations in the system's database, and user drop-down menu 132 contains a list of all the users in the system's database. The default for each of the drop-down menus is set to obtain the maximum number of results.

After the beginning and ending dates are specified, and any other desired selections are made, goal reporting button 96 is selected to generate a report similar to the one shown in FIG. 10. Report 22, shown in FIG. 10, displays summarized information based on the data in start date box 124, end date box 126, drop-down menu 128, status drop-down menu 130, organization drop-down menu 132, user drop-down menu 134, and any other selections made. The report typically presents detailed information for an individual salesperson. In the preferred embodiment, in addition to being displayed, report 22 is transmitted to the user or third party such as a supervisor or management by e-mail. When the user has completed the to-do list, the system automatically returns to leads worksheet 14, shown in FIG. 2.

Other functions of the system may be available on leads worksheet 14. For example, targets can be found and sorted using search worksheet button 98 and search all button 136. Search worksheet button 98 executes a search that is limited to targets on leads worksheet 14. Search all button 136 executes a search of the entire system's database. Prospecting cycle information for targets in leads worksheet 14 can be updated on the worksheet itself by selecting calendar icon 58 proximate to a target's suggested next cycle date box 32 and choosing a new date and time from the drop-down calendar. Selecting update button 104 causes any changes entered in leads worksheets 14 to be permanent.

To produce quick reports of when a user is scheduled to take steps with targets, either by selecting particular targets or defining an end date, a schedule function can be used by selecting the "KLPZ" schedule button 138. To generate a report of when a user is to take steps with selected targets, the selected targets are selected by clicking to-do box 38, and KLPZ schedule button 138 is selected. After KLPZ schedule button 138 is selected, a report of the steps to be performed for each selected target is displayed.

To generate a report of when a user is to take steps within a specific date range, the ending date is entered into schedule date box 140 by clicking calendar icon 58 and then KLPZ schedule button 138 is selected. After KLPZ schedule button 138 is selected, a report of the steps to be performed from the current date to the date entered into schedule date box 140 is displayed.

Additional features of the system include an alert function, administrative functions, and the ability to change a users profile or preferences. The alert function notifies the user when a target has responded to an electronic deliverable package. The notification may be visual such as a small dot next to the target's information in alert column 108 or some other type of notification such as an audible alert.

Figure 11:
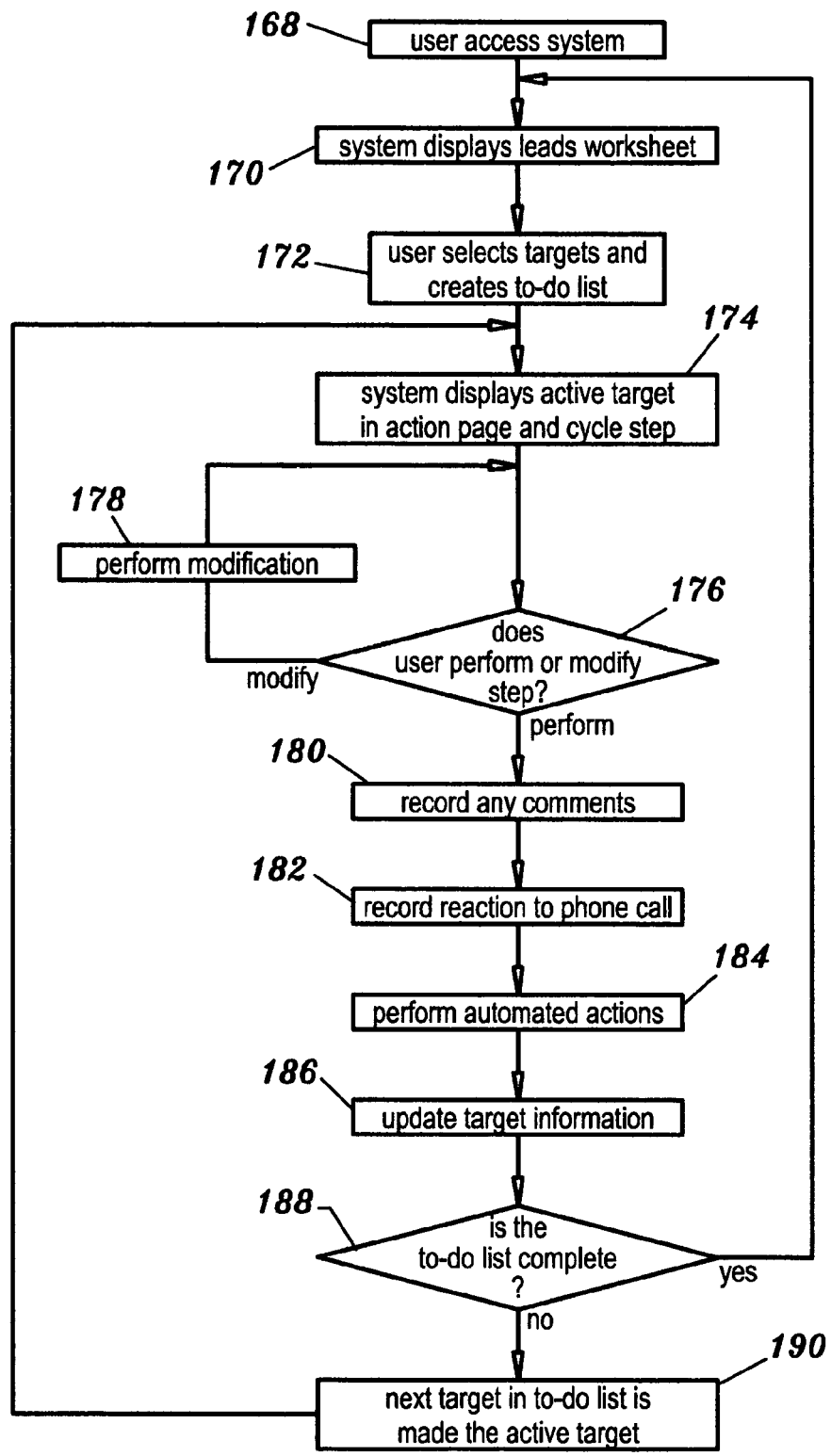
FIG. 11 is a flow chart depicting the steps use in the system in accordance with an embodiment of the present invention.

The administrative functions may be accessed by selecting admin button 142. Only an administrator or manager may have access to the administrative functions. Upon selection of admin button 142, the administrative screen 192 shown in FIG. 11 is displayed. Administrative screen contains suspect management link 150, silos link 152, manage cycle link 154, users link 156, organization link 158, suspect organization link 160, clip management link 162, import link 164, export link 166, new suspect button 194, and delete suspect button 196.

Suspect management link 150 allows the administrator to create, modify, or delete targets in the system's database. Silos link 152 allows the user to assign targets to users of the system so the assigned target is displayed when the user logs onto the system. Manage cycle link 154 allows the administrator to create, modify, or delete cycles and cycle steps. Users link 156 allows the administrator to create, modify, or delete users within the system's database. Organization link 158 allows the administrator to create, modify, or delete organizations within the system's database. Suspect organization link 160 allows the administrator to assign organizations within the system's database to suspects within the system's database. Clip management link 162 allows the administrator to create, modify, or delete video or audio clips that may be sent to a target during the execution of specific steps in a cycle. Import link 164 allows the administrator to import records into the system's database. Export link 166 allows the administrator to export all or a portion of the system's database. New suspect button 168 allows the administrator to add a new suspect to the system's database. Delete suspect button 170 allows the administrator to delete a suspect from the system's database.

Selection of my account button 146 provides the ability to manage the user's personal information and password as well as change the background or colors of displayed screens. All users may have access to my account button 146 or only administrators or managers may have access to my account button 146. Logoff button 148 logs the user off of the system.

As presented by the description, illustrative embodiments, and exemplary applications above, the system is a relatively simple system for salespersons to navigate sales target information in a database, use that information to achieve his sales initiatives, and create a history of user interaction with target data. The system also allows management to build business rules to ensuring a consistent marketing approach by its sales force. All this is achieved with virtually no input of information into the database by the salesperson.

Preferred forms of the invention have been shown in the drawings and described above, but variations in the preferred forms will be apparent to those skilled in the art. The preceding description is for illustration purposes only, and the invention should not be construed as limited to the specific form shown and described. The scope of the invention should be limited only by the language of the following claims.

What is claimed is:

1. A method of using a database navigation system on a server computer for producing closure to selected sales targets in a sales database by recording a successful contact with the target, recycling the target within database, or removing the target from the database, all by utilizing two main screens and a mouse, wherein the targets comprise clients or customers, the method comprising the steps of:

providing a database navigation system including a database on a server computer having at least one computer processor and at least one remote computer with software operational thereon providing access to the database through a network, the remote computer including an input/output device and display screens interactive therewith;

the database navigation system using the at least one computer processor to generate a navigable worksheet from the database;

the database navigation system providing access to the worksheet for at least one salesperson user, wherein the worksheet is a page on the display screen;

the navigable worksheet including at least one active target customer for a sale assigned to the salesperson user;

the navigation system displaying the at least one active target customer;

the database navigation system allowing the user to select sales targets from the worksheet;

the system automatically creating a to-do list for the salesperson user based on the targets selected by the user and an action page displaying the first active target on the salesperson user's to-do list, wherein the targets comprise clients or customers;

wherein on the action page, the system displays a recommended step in a prospecting cycle for the target;

the database navigation system generating steps for achieving closure of a sale to a customer following the pursuit of the selected targets, the steps being generated by the at least one computer processor based upon actions for conducting sales;

the system receiving the salesperson user inputs regarding selected or completed steps;

the system recording any salesperson user comments and reactions to any phone calls;

the system running automated actions, and updating the target's information in the system's database;

the system automatically generating the next steps in the target's prospecting cycle, wherein the prospecting cycle comprises several steps that the salesperson performs during a process for making sales to targets;

the system determining if the to-do list for the salesperson user is completed; if the to-do list for the salesperson user is completed, the system displaying each active or current target assigned to the user; if the to-do list for the salesperson user is not completed, the system activating the next target in the to-do list for the salesperson user and the action page displaying the newly-activated target.

2. The method of claim 1 wherein the action page contains pre-defined steps for use in achieving closure in the pursuit of the selected target.

3. The method of claim 2 wherein the steps are part of a sales cycle assigned to the target.

4. The method of claim 2 wherein the accessing page includes pre-defined reactions that result from the action taken in each step.

5. The method of claim 4 wherein the pre-defined steps include a first call, a second call, a third call, through N# of calls as defined.

6. The method of claim 4 wherein the reaction to the step is left a voice mail, left no voice mail, had a conversation with the target, made an appointment with the target, returned a call and had a conversation with the target, or returned a call and made an appointment with the target.

7. The method of claim 1 wherein the action page includes a voice mail script that is read when leaving a voice mail for the target.

8. The method of claim 1 wherein the action page includes a conversation script that is read when leaving conversing with the target.

9. The method of claim 2 wherein the action page includes a pre-defined e-mail that is transmitted after a pre-defined step is executed.

10. The method of claim 9 wherein the e-mail contains an attachment.

11. The method of claim 10 wherein the attachment is a video clip.

12. The method of claim 9 wherein the transmittal of the e-mail can be delayed.

13. The method of claim 2 wherein once the pre-defined step is executed, the next selected target is displayed on the action screen.

14. A database navigation system for producing closure to selected sales targets in a database by recording a successful contact with the target, recycling the target within the database, or removing the target from the database, all by utilizing two main screens and a mouse, wherein the targets comprise clients or customers, the database navigation system comprising:

a database navigation system including a database executed on a server computer having at least one computer processor and at least one remote computer with software operational thereon providing access to the database through a network, the remote computer including an input/output device and display screens interactive therewith;

a worksheet generated by the at least one computer processor from the database, and the system providing target selection options that are selectable by a salesperson user accessing the database from the at least one remote computer, wherein the targets comprise clients or customers, and wherein the worksheet is a page on the display screen;

the database navigation system automatically generating using the at least one computer processor an action page displaying at least one selected target for a sale assigned to the salesperson user; and the database navigation system automatically generating using the at least one computer processor a correct pursuit step for achieving closure to the selected targets by the salesperson user based upon actions for conducting sales;

the system receiving salesperson user inputs regarding the at least one pursuit step;

the system running automated actions, and updating the target's information in the system's database;

the system automatically generating and displaying the next pursuit steps in the target's prospecting cycle, wherein the prospecting cycle comprises several steps that the salesperson performs during a process for making sales to targets.

15. The system of claim 14 wherein the action page includes pre-defined steps for use in achieving closure in the pursuit of the selected target, the pre-defined steps being generated automatically by the system to be followed by the user.

16. The system of claim 15 wherein the steps are part of a sales cycle assigned to the target.

17. The system of claim 15 wherein the accessing page includes a pre-defined reactions to each step.

18. The system of claim 15 wherein the pre-defined steps include a first call, a second call, or a third call.

19. The system of claim 15 wherein the reaction to the step is left a voice mail, left no voice mail, had a conversation with the target, made an appointment with the target, returned a call and left a voice mail, returned a call and had a conversation with the target, or returned a call and had a conversation with the target, or returned a call and made an appointment with the target.

20. The system of claim 15 wherein once the pre-defined step is executed, the next selected target is displayed on the action screen.

* * * * *